United States Patent
Ando

(10) Patent No.: US 7,595,897 B2
(45) Date of Patent: Sep. 29, 2009

(54) DOUBLE-SIDE IMAGE FORMING APPARATUS AND DOUBLE-SIDE IMAGE FORMING METHOD

(75) Inventor: Motonobu Ando, Okazaki (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 602 days.

(21) Appl. No.: 10/753,197

(22) Filed: Jan. 8, 2004

(65) Prior Publication Data

US 2004/0207871 A1 Oct. 21, 2004

(30) Foreign Application Priority Data

Jan. 8, 2003 (JP) ............... 2003-002419

(51) Int. Cl.
*G06F 3/12* (2006.01)
(52) U.S. Cl. ............ 358/1.1; 358/1.2; 358/1.9; 358/1.13; 358/1.15; 358/1.16; 358/1.17; 358/539; 382/232; 382/236
(58) Field of Classification Search ........... 358/1.12, 358/1.6, 426.01, 426.02; 382/232
See application file for complete search history.

(56) References Cited

U.S. PATENT DOCUMENTS

| | | | | |
|---|---|---|---|---|
| 4,218,128 A * | 8/1980 | Satomi et al. | ........... | 399/85 |
| 4,978,980 A * | 12/1990 | Noguchi et al. | ........... | 347/111 |
| 5,105,230 A * | 4/1992 | Emori | ........... | 399/14 |
| 5,105,283 A * | 4/1992 | Forest et al. | ........... | 358/401 |
| 5,231,516 A * | 7/1993 | Kamon et al. | ........... | 358/449 |
| 5,398,289 A * | 3/1995 | Rourke et al. | ........... | 382/100 |
| 5,444,554 A * | 8/1995 | Muramatsu et al. | ........... | 358/494 |
| 5,539,445 A * | 7/1996 | Muramatsu et al. | ........... | 347/262 |
| 5,602,976 A * | 2/1997 | Cooper et al. | ........... | 358/1.17 |
| 5,619,343 A * | 4/1997 | Amemiya | ........... | 358/408 |
| 5,703,693 A * | 12/1997 | Morikawa | ........... | 358/296 |
| 5,731,879 A * | 3/1998 | Maniwa et al. | ........... | 358/296 |
| 5,808,752 A * | 9/1998 | Naba | ........... | 382/234 |
| 5,915,077 A * | 6/1999 | Kulkarni et al. | ........... | 358/1.9 |
| 5,915,079 A * | 6/1999 | Vondran et al. | ........... | 358/1.15 |
| 6,052,201 A * | 4/2000 | Shibaki et al. | ........... | 358/1.16 |
| 6,320,674 B1 * | 11/2001 | Soma et al. | ........... | 358/1.9 |

(Continued)

FOREIGN PATENT DOCUMENTS

JP A-8-274970 10/1996

(Continued)

*Primary Examiner*—King Y Poon
*Assistant Examiner*—Richard Z Zhu
(74) *Attorney, Agent, or Firm*—Oliff & Berridge, PLC

(57) ABSTRACT

When long binding is selected in a double-side record copy mode, images read from documents by a scanner section are stored in a memory in such a manner that image data of odd pages are stored as compressed data whereas image data of even pages are stored as not-compressed data. Print data are read from the memory at the time of formation of images page by page. Whenever a page of not-compressed data is read from the memory, the not-compressed data are inverted in terms of data sequence and sent to a printer section so that formation of an image on a sheet of recording paper by the printer section can start at the bottom of the page. Whenever a page of compressed data is read from the memory, the compressed data are expanded and sent to the printer section in order of reading data from the memory.

29 Claims, 12 Drawing Sheets

U.S. PATENT DOCUMENTS

| | | | |
|---|---|---|---|
| 6,473,196 B2 * | 10/2002 | Usami et al. | 358/1.18 |
| 6,553,207 B2 | 4/2003 | Tsusaka et al. | |
| 6,831,751 B1 * | 12/2004 | Mori | 358/1.13 |
| 6,985,258 B1 | 1/2006 | Kato | |
| 7,061,640 B1 * | 6/2006 | Maeda | 358/1.17 |
| 7,123,385 B2 * | 10/2006 | Oteki et al. | 358/474 |
| 2002/0039508 A1 | 4/2002 | Tsusaka et al. | |
| 2002/0041384 A1 * | 4/2002 | Moriura et al. | 358/1.9 |
| 2002/0044298 A1 * | 4/2002 | Kaneko et al. | 358/1.15 |

FOREIGN PATENT DOCUMENTS

| | | |
|---|---|---|
| JP | A-9-331434 | 12/1997 |
| JP | A 10-93809 | 4/1998 |
| JP | A 10-166544 | 6/1998 |
| JP | A-2001-146046 | 5/2001 |
| JP | A 2001-223884 | 8/2001 |
| JP | A 2002-104707 | 4/2002 |
| JP | A 2002-145536 | 5/2002 |

* cited by examiner

DOUBLE-SIDE IMAGE FORMING APPARATUS AND DOUBLE-SIDE IMAGE FORMING METHOD

BACKGROUND OF THE INVENTION

1. Field of the Invention

The present invention relates to a double-side image forming apparatus and a double-side image forming method for forming images on both surfaces of each recording medium on the basis of image data.

2. Description of the Related Art

In the related art, there has been known a double-side image forming apparatus including a storage unit for storing image data, an image forming unit, and a transporting unit. The image forming unit forms an image on a recording medium (such as a sheet of paper or a film) transported in a predetermined direction, on the basis of image data stored in the storage unit. The transporting unit transports the recording medium in the predetermined direction relative to the image forming unit. In order to form images on both surfaces of the recording medium, the following processes are performed. An image is formed on a front surface of the recording medium. Then, the recording medium is turned upside down to change a downstream side end of the recording medium during the formation of the image to an upstream side end viewed from the transporting direction of the recording medium. The recording medium is transported in the predetermined direction relative to the image forming unit again to form an image on a rear surface of the recording medium. The recording medium is successively stacked on a paper outlet tray.

In this type double-side image forming apparatus, it is preferable that a larger number of images can be formed on recording media continuously and that recording media discharged to a paper outlet tray can be bound together while stacked on the paper outlet tray as they are discharged.

For example, the way of binding a plurality of recording media in sides parallel to the transporting direction of the recording media or the way of binding a plurality of recording media in sides perpendicular to the transporting direction of the recording media may be used for binding the plurality of recording media after the formation of images. In either case, it is preferable that images appear in a predetermined direction without inversion when a user reads the recording media by turning the pages of the recording media one by one.

In this type double-side image forming apparatus, the transporting direction of each recording medium is however reversed (the recording medium is transported while the downstream side end of the recording medium during the formation of an image on the front surface of the recording medium is changed to an upstream side end viewed from the transporting direction of the recording medium) when an image is formed on the rear surface of the recording medium. Accordingly, if recording media stacked on the paper outlet tray are bound in sides parallel to the transporting direction of the recording media while the recording media are stacked, there arises a so-called inversion phenomenon that inverted images appear on alternate pages when the user reads images on the recording media by turning the pages one by one.

As an apparatus to prevent the inversion phenomenon, there has been known an apparatus in which image data stored in a memory, which is a storage unit, before formation of images on recording media are inverted in terms of data sequence on alternate pages so that image data not-inverted and image data inverted are used alternately for forming images on the recording media (e.g., JP-A-Hei. 10-166544 (pages 7-8; and FIGS. 4-10)).

On the other hand, the capacity of the memory for storing image data limits number of documents allowed to be used for forming images on recording media continuously. In consideration of the limitation, there has also been known an apparatus in which image data are compressed and stored as compressed data in the memory, and the compressed data are read from the memory and expanded at the time of formation of images so that the number of documents allowed to be used for forming images continuously can be increased while the amount of memory consumption per document page can be suppressed (e.g., JP-A-2001-223884(page 29; and FIG. 41).

According to the apparatus disclosed in JP-A-Hei. 10-166544, there is however a problem that the capacity of the memory limits the number of documents allowed to be used for forming images continuously because the apparatus has no compression unit by which the capacity of the memory to be used can be reduced when image data are stored in the memory.

According to the apparatus disclosed in JP-A-2001-223884, there is a problem that the time required for forming images is prolonged because data processing must be carried out for expanding and inverting compressed data in terms of data sequence on alternate pages to prevent the inversion phenomenon when images are formed on recording media.

SUMMARY OF THE INVENTION

Therefore, an object of the invention is to provide a double-side image forming apparatus and a double-side image forming method in which: the inversion phenomenon that inverted images appear on alternate pages can be prevented when a user reads images on recording media bound after the formation of images by turning the pages one by one; and the storage area of a storage unit (e.g. memory) for storing image data used for forming images can be saved so that the number of documents allowed to be used for forming images continuously can be increased while the time required for forming images can be shortened.

According to a first aspect of the invention, a double-side image forming apparatus includes a storage unit, an image forming unit, a transporting unit, an image data compression unit, and an image data storage unit. The storage unit stores data. The image forming unit forms an image on a recording medium being transported in a predetermined direction on the basis of the data stored in the storage unit. The transporting unit transports the recording medium and turns upside down the recording medium one surface of which the image has been formed. The image data compression unit compresses image data. The image data storage unit makes the image data compression unit compresses image data of a single page including data sequence of a forward direction with respect to the predetermined direction and makes the storage unit store the compressed image data. The image data storage unit makes the storage unit stores image data of a single page including data sequence of a reverse direction with respect to the predetermined direction.

In the double-side image forming apparatus of the first aspect, of image data used for forming images on recording medium, the storage unit stores the compressed image data including data sequence of a forward direction with respect to the predetermined direction. On the other hand, the storage unit stores image data of a single page including data sequence of a reverse direction with respect to the predetermined direction. Accordingly, the problem caused by compression of image data including the data sequence of the reverse direction with respect to the transporting direction of the recording media can be prevented while the storage area of the storage unit can be saved by compression of image data.

That is, if image data including the data sequence of the reverse direction with respect to the transporting direction of the recording medium is compressed, it is necessary to expand and invert the compressed data in terms of data sequence for forming images on the recording media. In the embodiment of the invention, such image data are stored as not-compressed data in the storage unit so that the time required for forming images can be shortened.

According to a second aspect of the invention, a double-side image forming apparatus includes a storage unit, an image forming unit, a transporting unit, an image data compression unit, and a control unit. The storage unit which stores data. The image forming unit forms an image on a recording medium being transported in a predetermined direction on the basis of the data stored in the storage unit. The transporting unit transports the recording medium and turns upside down the recording medium one surface of which the image has been formed. The image data compression unit compresses image data. The control unit makes the image data compression unit compress first image data an image of which is to be formed from a top thereof and makes the storage unit store the compressed first image data. The control unit makes the storage unit store second image data an image of which is to be formed from an end thereof.

According to a third aspect of the invention, a double-side image forming method includes compressing image data of a single page including data sequence of a forward direction with respect to a predetermined direction and storing the compressed image data; storing image data of a single page including data sequence of a reverse direction with respect to the predetermined direction; forming images on both surfaces of a recording medium while transporting the recording medium in the predetermined direction on the basis of the compressed image data including the data sequence of the forward direction with respect to the predetermined direction and the image data including the data sequence of the reverse direction with respect to the predetermined direction; and turning upside down the recording medium one surface of which the image has been formed.

DETAILED DESCRIPTION OF THE PREFERRED EMBODIMENT (Embodiment 1)

An embodiment of the invention will be described below with reference to the drawings.

Figure 1:
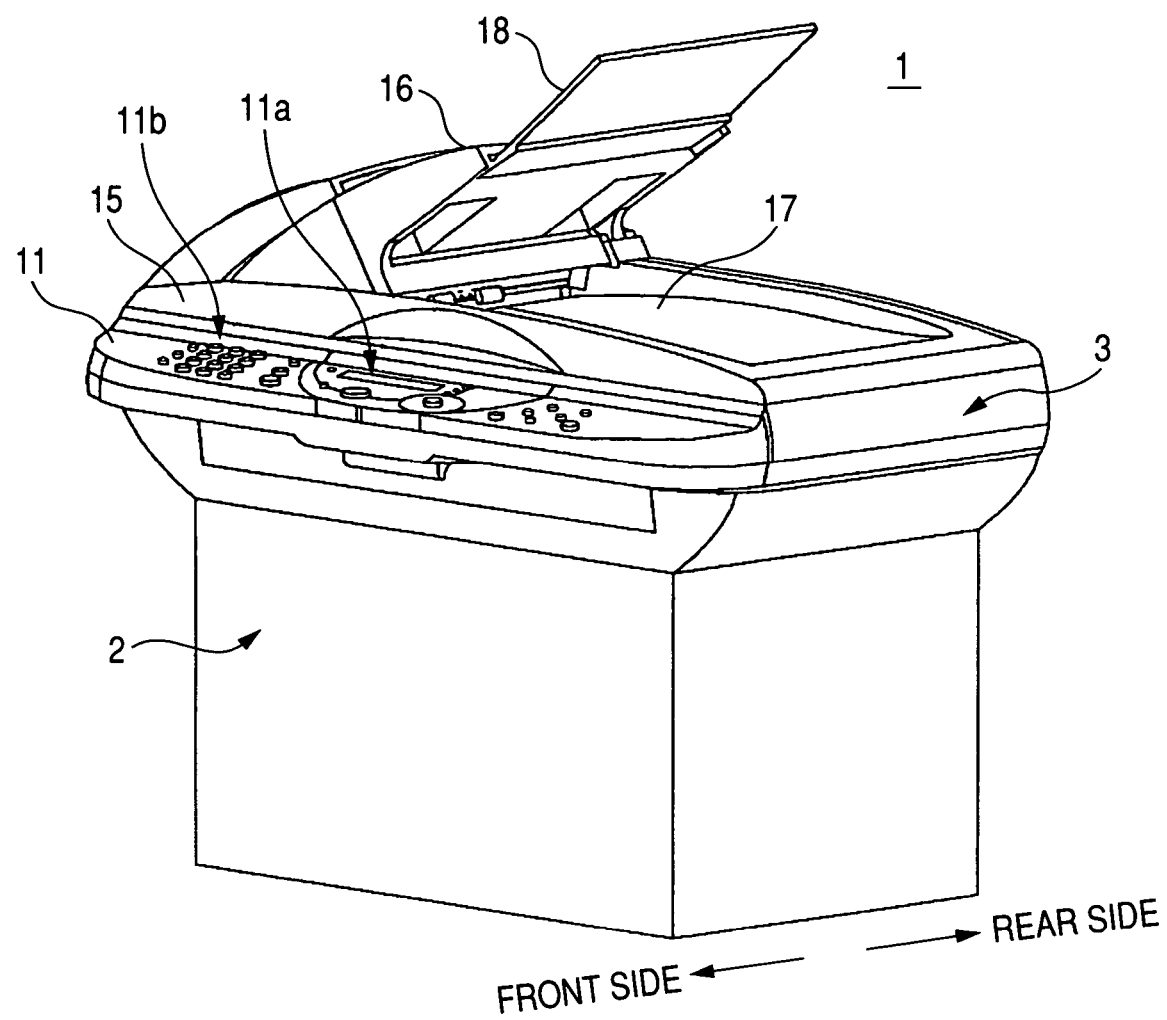
FIG. 1 is a perspective view showing an external appearance of a multi function device according to an embodiment of the invention.

FIG. 1 is a perspective view showing an external appearance of a multi function device 1 according to an embodiment of the invention.

As shown in FIG. 1, the multi function device 1 according to the embodiment generally includes a printer section 2 located in a lower portion of the multi function device 1, and a scanner section 3 located in an upper portion of the multi function device 1. A printer function, a scanner function and a copying function can be achieved by the operations of these sections 2 and 3. FIG. 1 shows a case where the printer section 2 has a substantially rectangular parallelepiped shape. However, the printer section 2 actually has a paper output hole into which a paper outlet tray 38 can be detachably attached, and a paper supply cassette 32 as will be described later. The paper outlet tray 38 and the paper supply cassette 32 are provided at a front side of the multi function device 1.

An operation panel 11 is provided in a front upper portion of the multi function device 1. The operation panel 11 includes an LCD portion 11a for displaying an operating state of the apparatus 1 or the like, and operation buttons 11b for inputting various instructions.

A document table cover 15 is provided in an upper portion of the multi function device 1 so as to rotate around hinge portions 10 (not shown in FIG. 1 but shown in FIG. 2) disposed in a rear side of the multi function device 1.

Figure 2:
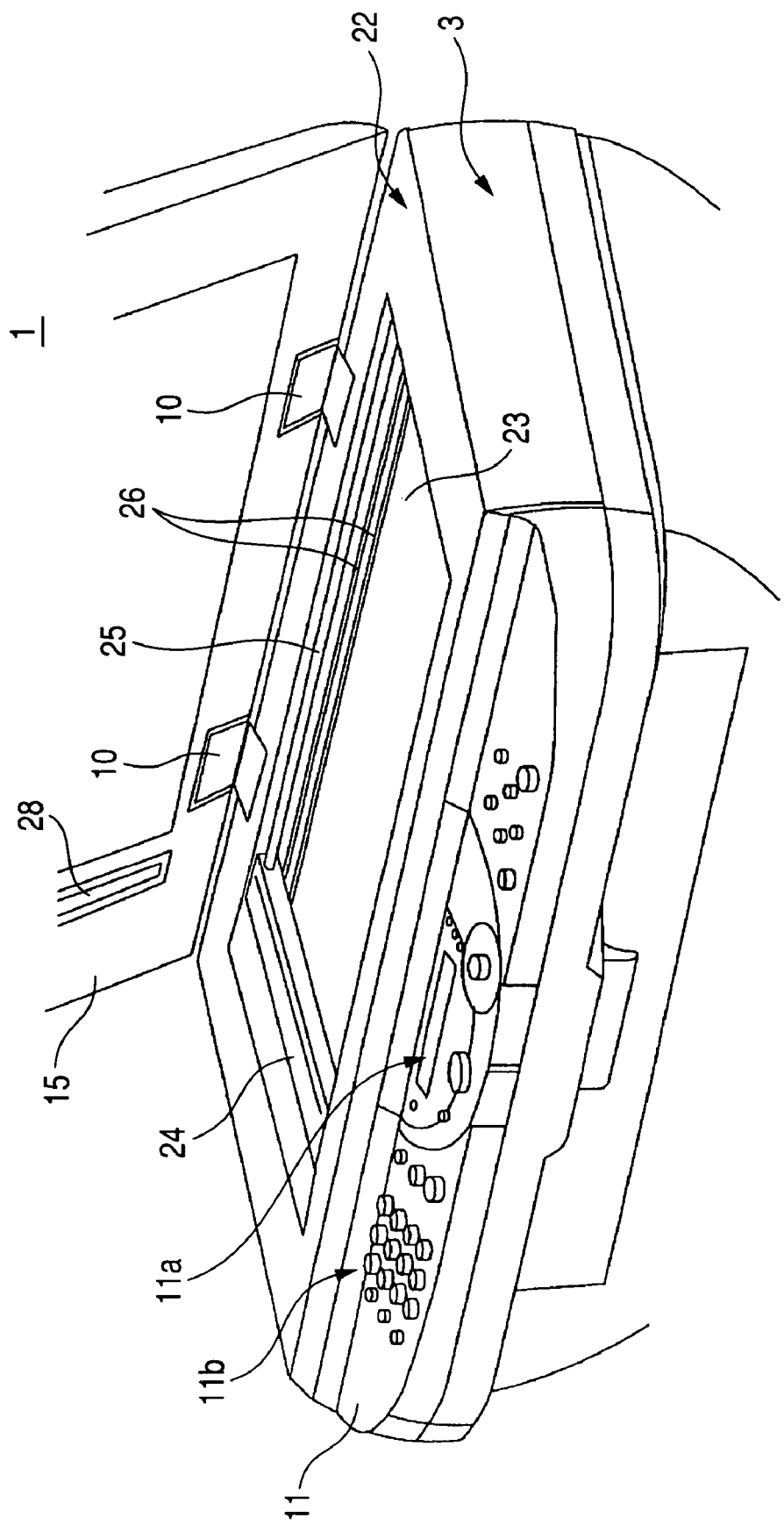
FIG. 2 is a perspective view showing a configuration of a scanner section in the multi function device according to this embodiment.

The scanner section 3 will be described first with reference to FIGS. 1 and 2. FIG. 2 is a perspective view showing a state in which the document table cover 15 of the multi function device 1 is opened.

As shown in FIG. 2, the scanner section 3 is of a flat bed type and is formed so that a line CCD unit 24 reads an image from a document placed on a platen glass plate 23 provided in a document table 22.

The CCD unit 24 includes one end pierced by a guide shaft 25, and the other end put on a guide rail (not shown). In this manner, the CCD unit 24 is supported. The CCD unit 24 moves along the platen glass plate 23 while interlocked with a belt 26 driven by a drive motor (not shown).

An ADF (Auto Document Feeder) mechanism 16 (see FIG. 1) for reading images from a plurality of document sheets successively is provided at an upper left end of the document table cover 15. The ADF mechanism 16 operates as follows. In the condition that the document table cover 15 is closed and the CCD unit 24 is fixed to an initial reading position, document sheets are one by one taken in from a document supply tray 18 (see FIG. 1) so as to pass through a document passage portion 28 located above the CCD unit 24. The CCD unit 24 reads an image line by line from each document. After the image is read, each document is discharged to a document outlet tray 17 (see FIG. 1).

According to the scanner section 3 in this embodiment, hence, images can be read page by page successively from a plurality of document sheets placed on the document supply tray 18 through the ADF mechanism 16 or a one-page's image can be read from a document sheet placed on the platen glass plate 23 by a user.

Figure 3:
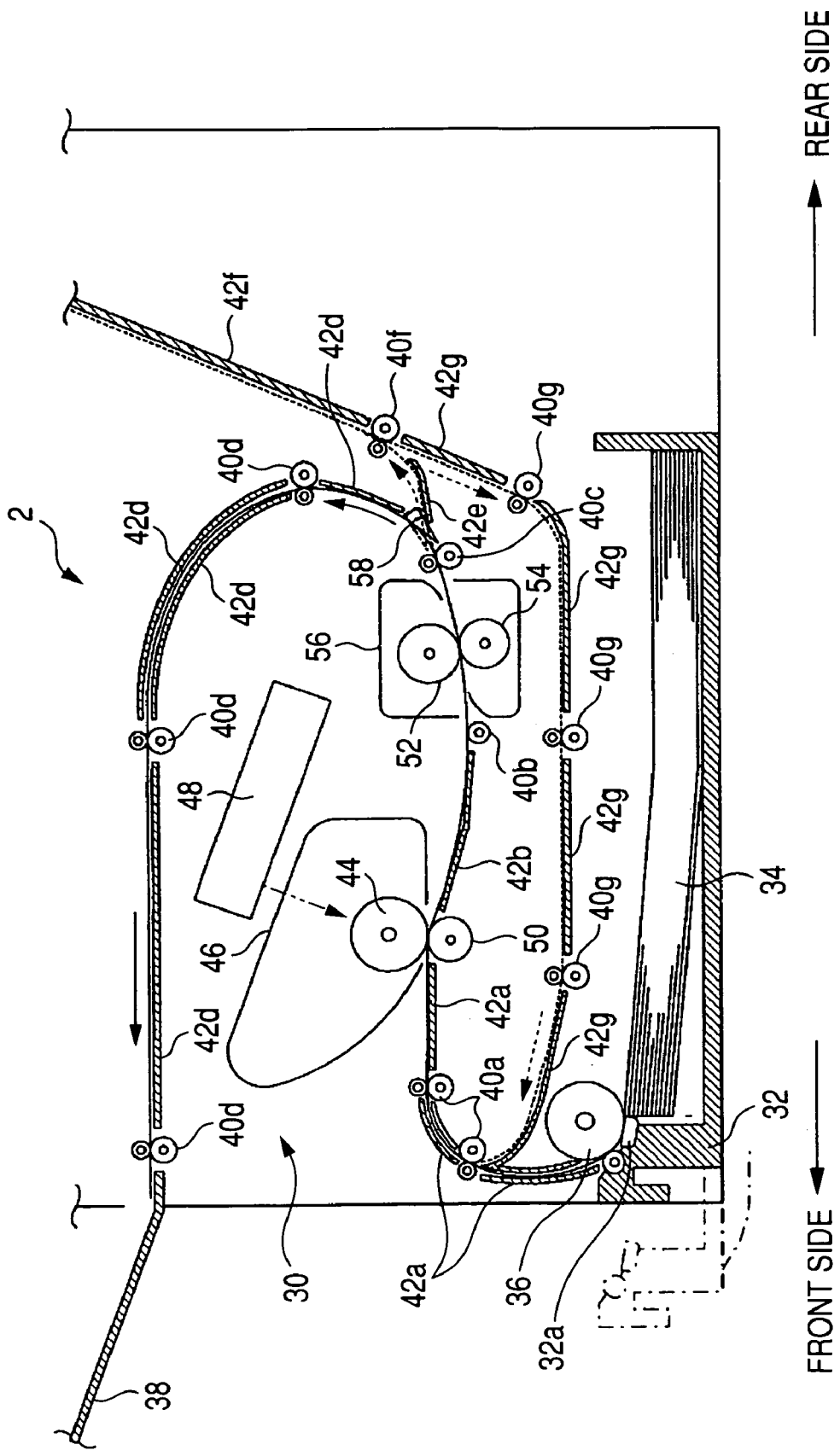
FIG. 3 is a sectional view showing a configuration of a printer section in the multi function device according to this embodiment.

The printer section 2 will be described below with reference to FIG. 3. FIG. 3 is a sectional view showing a schematic configuration of the printer section 2 of the multi function device 1.

As shown in FIG. 3, the printer section 2 includes a printer engine 30, a paper supply cassette 32, a feed roller 36, transporting rollers 40, and paper guides 42. The paper supply cassette 32 stores a large number of stacked sheets of recording paper 34 as recording media. The feed roller 36 feeds one by one the sheets of recording paper 34 stored in the paper supply cassette 32 to the printer engine 30 side through a separating pad 32a provided in the paper supply cassette 32. The transporting rollers 40 and the paper guides 42 transport each sheet of recording paper 34 fed through the feed roller 36 toward the printer engine 30 and discharge each sheet of recording paper 34 after image formation toward the paper outlet tray 38 externally attached to the multi function device 1.

In FIG. 3, the transporting rollers 40 and the paper guides 42 are designated by the reference numerals 40 and 42 followed by alphabets according to necessity for the sake of convenience of description. Almost of the transporting rollers 40 are provided as pairs of rollers, each pair having a large-diameter drive roller rotated by motive power received from a drive motor (not shown), and a small-diameter driven roller rotated by friction acting on a sheet of recording paper 34 clamped between the drive roller and the driven roller.

The paper supply cassette 32 is inserted in the multi function device 1 from the outside so as to be attached to a lower end position of a left side surface of the multifunction apparatus 1. The paper outlet tray 38 is also detachably attached to the left side surface of the multi function device 1.

On the other hand, the printer engine 30 includes a toner cartridge 46, a laser beam generator 48, a transfer roller 50, and a fixing unit 56. A photoconductor drum 44 is built in the toner cartridge 46. The laser beam generator 48 irradiates a laser beam onto the photoconductor drum 48 to form an electrostatic latent image on the photoconductor drum 44. The transfer roller 50 presses a sheet of the recording paper 34 against the photoconductor drum 44 on which toner is deposited along the electrostatic latent image formed by the laser beam generator 48 to transfer the toner image onto the sheet of the recording paper 34. In the fixing unit 56, a heat roller 52 and a pressure roller 54 press the sheet of recording paper 34 on which the toner image is formed to fix the image onto the sheet of recording paper 34.

That is, a known printer engine for laser printer can be used as the printer engine 30 in this embodiment. An image corresponding to image data input to the laser beam generator 48 is formed on the sheet of recording paper 34.

The printer section 2 in this embodiment is provided so that the transporting rollers 40 and the paper guides 42 allow images to be formed not only on a single surface but also on both surfaces of the sheet of recording paper 34.

That is, a sheet of recording paper 34 fed from the paper supply cassette 32 through the feed roller 36 is first transported to an image forming section including the photoconductor drum 44 and the transfer roller 50 through the transporting rollers 40a and the paper guides 42a of a paper feed system that feeds paper to the printer engine 30. In the image forming section, a toner image is formed on a single surface (front surface) of the sheet of recording paper 34.

Incidentally, in this embodiment, the toner image is formed on the front surface of the sheet of recording paper 34 in such a manner that image data read from the document by the CCD unit 24 are input to the laser beam generator 48 in reading order.

The sheet of recording paper 34 with the toner image formed thereon is then transported to the fixing unit 56 through the paper guide 42b and the transporting roller 40b including only a drive roller being in contact with the rear surface of the sheet of recording paper 34. After the fixing unit 56 fixes the image, the sheet of recording paper 34 is discharged from the fixing unit 56 through the transporting rollers 40c.

A guide member 58 is provided on the downstream side of the transporting rollers 40c. The guide member 58 switches a transporting path of the sheet of recording paper 34 between the paper guide side 42d of a paper discharge system in which the sheet of recording paper 34 is guided to the paper outlet tray 38 side and the paper guide 42e side of a paper re-feed system in which the sheet of recording paper 34 is turned upside down and is re-fed. Incidentally, the guide member 58 is of a known type in which the guide member 58 is swung by electromagnetic solenoid or the like to thereby switch the transporting path of the sheet of recording paper 34.

When an image has been already formed on the front surface of the sheet of recording paper 34 in a single-side image formation mode or when images have been already formed on the front and rear surfaces of the sheet of recording paper 34 in a double-side image formation mode, the guide member 58 is switched to a paper discharge position represented by a solid line in FIG. 3. Then, the sheet of recording paper 34 discharged from the fixing unit 56 through the transporting rollers 40c is led to the paper guide 42d side of the paper discharge system.

The sheet of recording paper 34 led to the paper guide 42d side of the paper discharge system through the guide member 58 is further transported to the paper outlet tray 38 through the transporting rollers 40d and the paper guides 42d of the paper discharge system provided on the downstream side of the guide member 58.

On the other hand, when an image has been already formed on one surface (front surface) of the sheet of recording paper 34 in the double-side image formation mode, the guide member 58 is switched to the paper re-feed position represented by broken lines in FIG. 3. Then, the sheet of recording paper 34 discharged from the fixing unit 56 through the transporting rollers 40c is led to the paper guide 42e side of the paper re-feed system.

The sheet of recording paper 34 led to the paper guide 42e of the paper re-feed system through the guide member 58 is then once transported, through the transporting rollers 40f, to the paper guide 42f, which is provided in the rear of the paper guide 42d of the paper discharge system to stand at a predetermined angle. The transporting rollers 40f are different from other transporting rollers 40 in that the drive roller can be rotated normally and reversely. After the sheet of recording paper 34 is entirely transported to the paper guide 42f, the transporting rollers 40f are rotated reversely.

The sheet of recording paper 34 is transported back toward the paper guide 42e side by the reverse rotation of the transporting rollers 40f. As shown in FIG. 3, the paper guide 42e is horizontally separated from the transporting rollers 40f. The plate surface of the paper guide 42e is substantially horizontal whereas the plate surface of the paper guide 42*f* is inclined greatly. Accordingly, the sheet of recording paper 34 transported back from the paper guide 42*f* by the reverse rotation of the transporting rollers 40*f* is not led to the paper guide 42*e* but led from a gap between the paper guide 42*e* and the transporting rollers 40*f* to the paper guide 42*g* side of the paper re-feed system disposed below the transporting rollers 40*f*.

The sheet of recording paper 34 led to the paper guide 42*g* side is further transported to the transporting rollers 40*a* just after the feed roller 36 through the transporting rollers 40*g* and the paper guides 42*g* disposed on the downstream side. On this occasion, the sheet of recording paper 34 is transported in the condition that the sheet of recording paper 34 is turned upside down in comparison with the case where the sheet of recording paper 34 is fed from the paper supply cassette 32 for forming an image on a single surface (front surface) of the sheet of paper 34 by the printer engine 30. Moreover, an upstream side end of the sheet of recording paper 34 viewed from the transporting direction of the sheet of recording paper 34 at the time of image formation on the front surface of the sheet of recording paper 14 is changed to a downstream side end on this occasion. Accordingly, when the sheet of recording paper 34 is then transported to the printer engine 30, an image is formed on a surface (rear surface) opposite to the surface on which an image has been already formed.

The sheet of recording paper 34 with the image formed on its rear surface by the printer engine 30 in this manner is led to the paper guides 42*d* of the paper discharge system through the guide member 58 and further transported to the paper outlet tray 38 through the transporting rollers 40*d* and the paper guides 42*d* of the paper discharge system.

Incidentally, the paper outlet tray 38 is located above the printer engine 30. Moreover, the sheet of recording paper 34 is discharged to the paper outlet tray 38 in a direction reverse to the transporting direction of the sheet of recording paper 34 in the printer engine 30. Accordingly, the sheet of recording paper 34 is stacked on the paper outlet tray 38 in a so-called face down style in which the image-forming surface of the sheet of recording paper 34 faces down.

Figure 4:
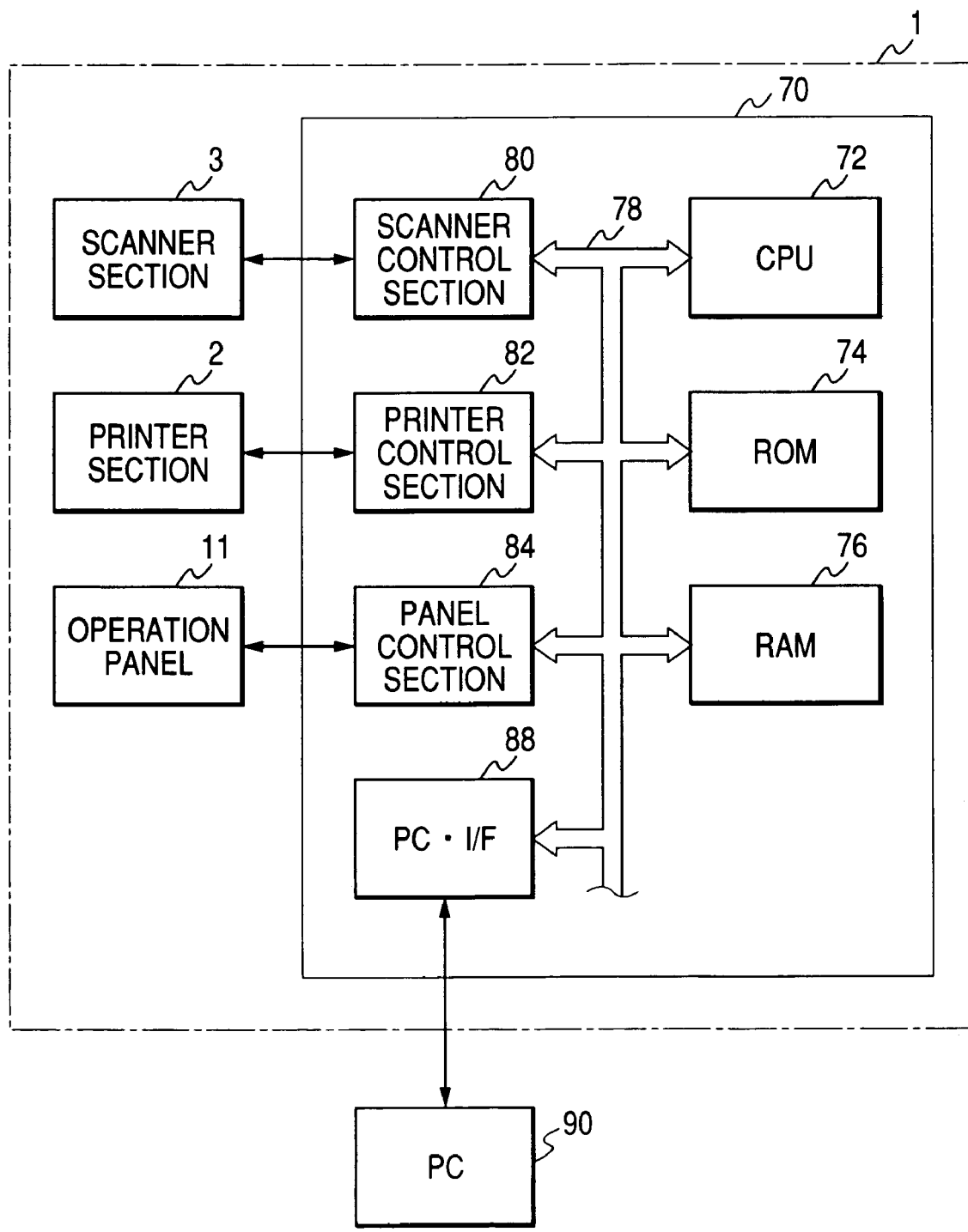
FIG. 4 is a block diagram showing a configuration of a controller included in the multi function device according to this embodiment.

FIG. 4 is a block diagram showing a configuration of a controller 70 included in the multi function device 1, for controlling the aforementioned respective parts.

The controller 70 controls the printer section 2 and the scanner section 3 in accordance with instructions input by a user through the operation buttons 11*b* of the operation panel 11 or instructions given from an external personal computer (hereinafter simply referred to as PC) 90 so that the multi function device 1 in this embodiment can be operated as a printer, a scanner or a copying machine. The controller 70 is provided as a known micro-computer mainly including a CPU 72, an ROM 74, an RAM 76, and a bus line 78 for connecting these parts to one another.

The controller 70 further includes a scanner control section 80, a printer control section 82, a panel control section 84, and a PC interface (hereinafter simply referred to as PC I/F) 88. The scanner control section 80 controls the scanner section 3 in accordance with instructions given from the CPU 72. The printer control section 82 controls the printer section 2 in the same manner as described above. The panel control section 84 inputs various kinds of command signals given through the operation panel 11 and displays various kinds of messages on the LCD portion 11*a* of the operation panel 11 in accordance with instructions given from the CPU 72. The PC interface 88 exchanges various kinds of data with the PC 90. These sections 80, 82, 84 and 88 are connected to the CPU 72, the ROM 74 and the RAM 76 through the bus line 78.

When there is a "print" request from the PC 90, the CPU 72 temporarily stores print data then received from the PC 90 in a print data storage area of the RAM 76 and transfers the print data to the printer control section 82 to thereby make the printer control section 82 control the printer section 2 to form an image based on the print data on a sheet of recording paper 34. When there is an "image read" request from the PC 90, the CPU 72 makes the scanner control section 80 control the scanner section 3 to read an image of a document placed on the platen glass plate 23 by the user or placed on the document supply tray 18 and transfer the read image data to the PC 90. The multi function device 1 operates as a printer or a scanner in this procedure.

When a command to set the operating mode of the multi function device 1 is input by the user through the operation panel 11, the CPU 72 makes the LCD portion 11*a* display a message for setting of the operating mode in accordance with the input command and sets the operating mode of the multi function device 1 in accordance with commands input by the user in accordance with the message.

When a "copy" command is input by the user through the operation panel 11, the CPU 72 makes the scanner control section 80 control the scanner section 3 in accordance with the operating mode concerning "copy" set at this time to read an image of a document placed on the platen glass plate 23 by the user or placed on the document supply tray 18, convert the read image data into print data and store the print data in a print data storage area of the RAM 76. When reading of the document is completed, the CPU 72 transfers the print data stored in the RAM 76 to the printer control section 82 and controls the printer control section 82 to form (copy) the image read from the document on the sheet of recording paper 34.

Among various kinds of controlling processes executed by the CPU 72 as described above, document copy controlling processes, which is chief processes in the invention, will be described below with reference to flow charts shown in FIGS. 5 and 6.

Figure 5:
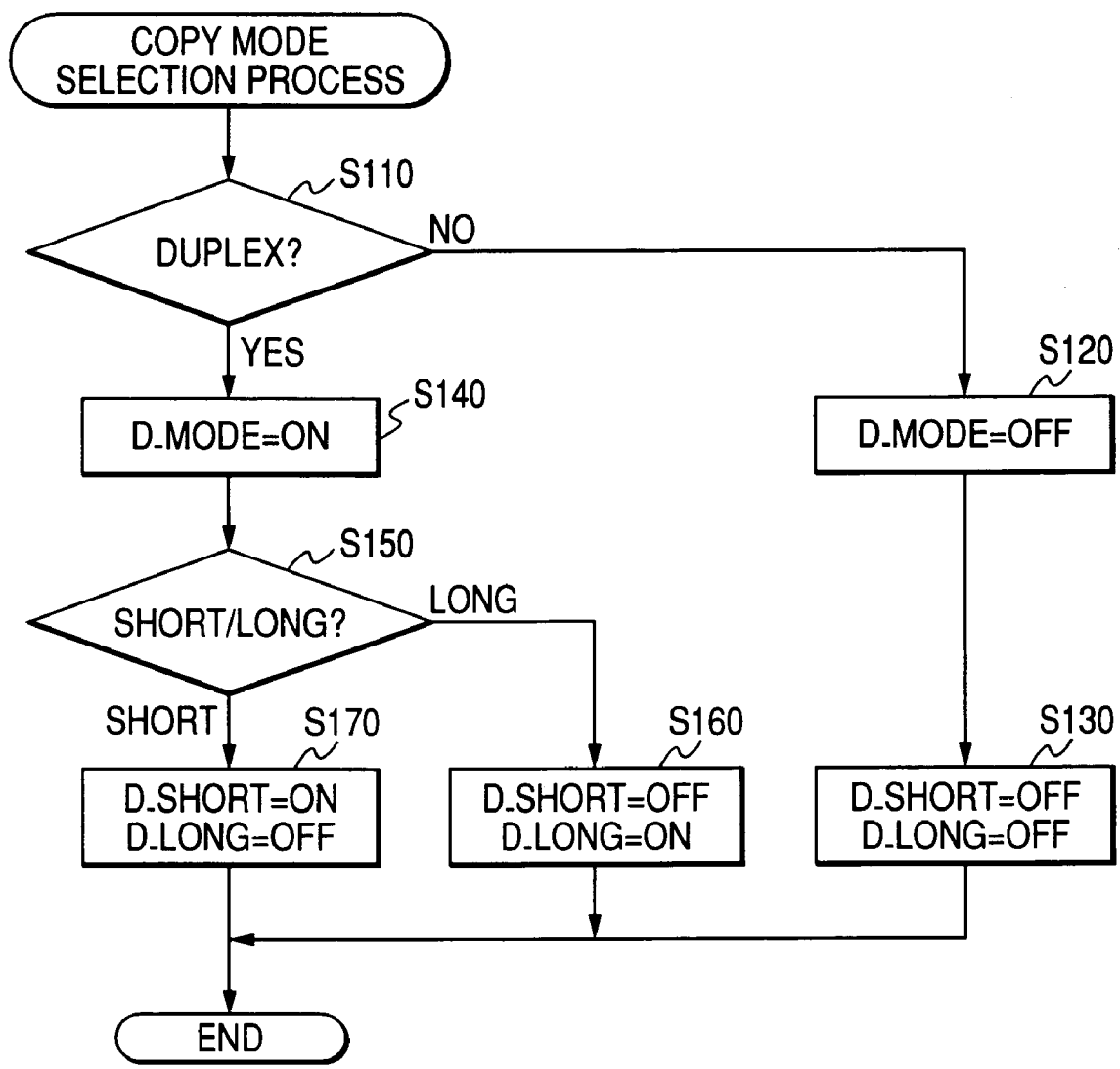
FIG. 5 is a flow chart showing a copy mode selection process executed by the controller depicted in FIG. 4.

FIG. 5 is a flow chart showing a copy mode selection process executed when the operating mode is set for copying the document in accordance with user's instructions.

This process is executed when the user inputs a command to set the operating mode for copying through the operation panel 11. When this process starts, a message is first displayed on the LCD portion 11*a* so that the user can select a mode from a double-side record copy mode (DUPLEX) for successively reading images from single-sided document sheets placed on the document supply trays 18 and forming the read images of the document sheets on both surfaces of each sheet of recording paper 34 and an ordinary copy mode for forming a one-page's image on a single surface of each sheet of recording paper 34. In S110 (in which S means step), a judgment is made as to whether the double-side record copy mode (DUPLEX) is selected or not.

When a decision in S110 results in that the double-side record copy mode (DUPLEX) is not selected (that is, the user selects the ordinary copy mode), a flag "D_MODE" indicating the double-side record copy mode is reset (OFF) in S120 and both a flag "D_LONG" indicating binding of sheets of recording paper 34 on sides parallel to the transporting direction of the sheets of recording paper 34 after double-side record copying (hereinafter referred to as long binding) and a flag "D_SHORT" indicating binding of sheets of recording paper 34 on sides perpendicular to the transporting direction of the sheets of recording paper 34 after double-side record copying (hereinafter referred to as short binding) are reset (OFF) in S130. Then, this process is terminated.

On the other hand, when a decision in S110 results in that the double-side record copy mode (DUPLEX) is selected, the process proceeds to S140 in which the flag "D_MODE" indicating the double-side record copy mode is set (ON). Then, a message is displayed on the LCD portion 11a so that the user can select the way of binding the sheets of recording paper 34 after double-side record copying from the two of long binding (LONG) and short binding (SHORT). In S150, a judgment is made as to which of the two binding ways the user selects.

When a decision in S150 results in that the user selects long binding (LONG) as the way of binding the sheets of recording paper 34 after double-side record copying, the flag "D_LONG" indicating the long binding is set (ON) and the flag "D_SHORT" indicating the short binding is reset (OFF) in S160. Then, this process is terminated.

When a decision in S150 results in that the user selects the short binding (SHORT) as the way of binding the sheets of recording paper 34 after double-side record copying, the flag "D_SHORT" indicating the short binding is set (ON) and the flag "D_LONG" indicating the long binding is reset (OFF) in S170. Then, this process is terminated.

As described above, this embodiment is configured so that either the double-side record copy mode or the ordinary copy mode can be selected as the operating mode for copying the documents. In addition, this embodiment is configured so that either the short binding (SHORT) or the long binding (LONG) can be further selected as the way of binding the sheets of recording paper 34 after copying when the double-side record copy mode is selected.

The selection result is stored as the three flags "D_MODE", "D_SHORT" and "D_LONG". At the time of copying after the storage of the selection result, the method for processing the image data read from the documents and forming the images on the sheets of recording paper 34 can be switched in accordance with the operating mode decided by states of the three flags.

Figure 6:
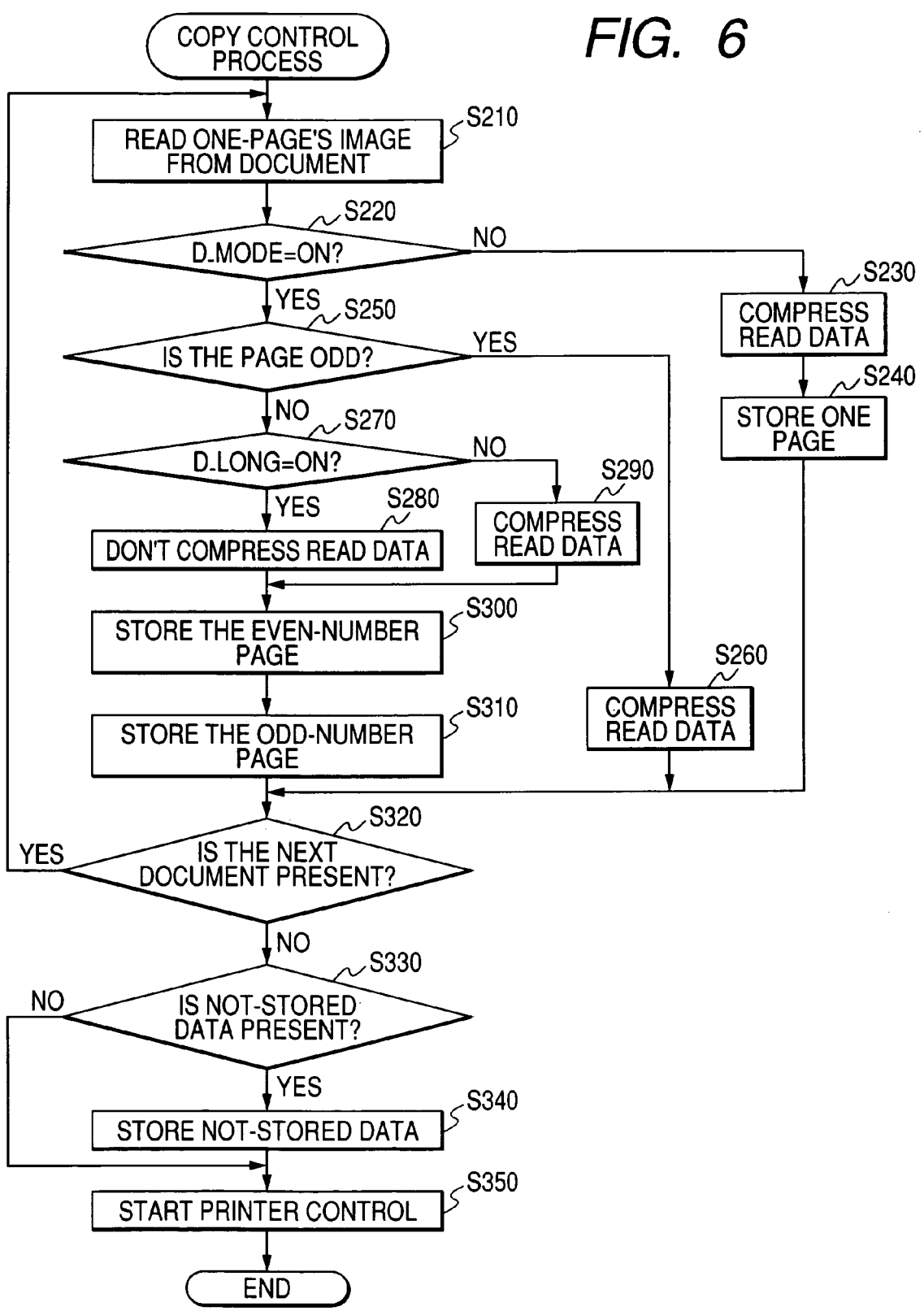
FIG. 6 is a flow chart showing a copy control process executed by the controller depicted in FIG. 4.

FIG. 6 shows a copy control process executed when the user inputs a "document copy" command through the operation buttons 11b of the operation panel 11.

As shown in FIG. 6, when this process starts, S210 is first carried out. That is, in step S210, the CPU 72 makes the scanner control section 80 control the scanner section 3 to read a one-page's image from each document placed on the platen glass plate 23 by the user or placed on the document supply tray 18.

Then, in S220, a judgment is made as to whether the flag "D_MODE" is set (ON) or not, that is, whether the double-side record copy mode (DUPLEX) is selected as the operating mode at the time of document copying or not. When a decision in S220 results in that the double-side record copy mode (DUPLEX) is not selected (that is, the ordinary copy mode is selected), the process proceeds to S230. In S230, the image data read in S210 (read data) are compressed. Then, in S240, the compressed data are stored as one-page's data in the print data storage area of the RAM 76 for forming an image on only one surface of each sheet of recording paper 34. Then, the process proceeds to S320.

On the other hand, when a decision in S220 results in that the flag "D_MODE" is set (ON), that is, the double-side record copy mode (DUPLEX) is selected, the process proceeds to S250. In S250, a judgment is made as to whether the image read at this time from the document in S210 is of an odd page in the plurality of documents placed on the document supply tray 18 or not.

Figure 7:
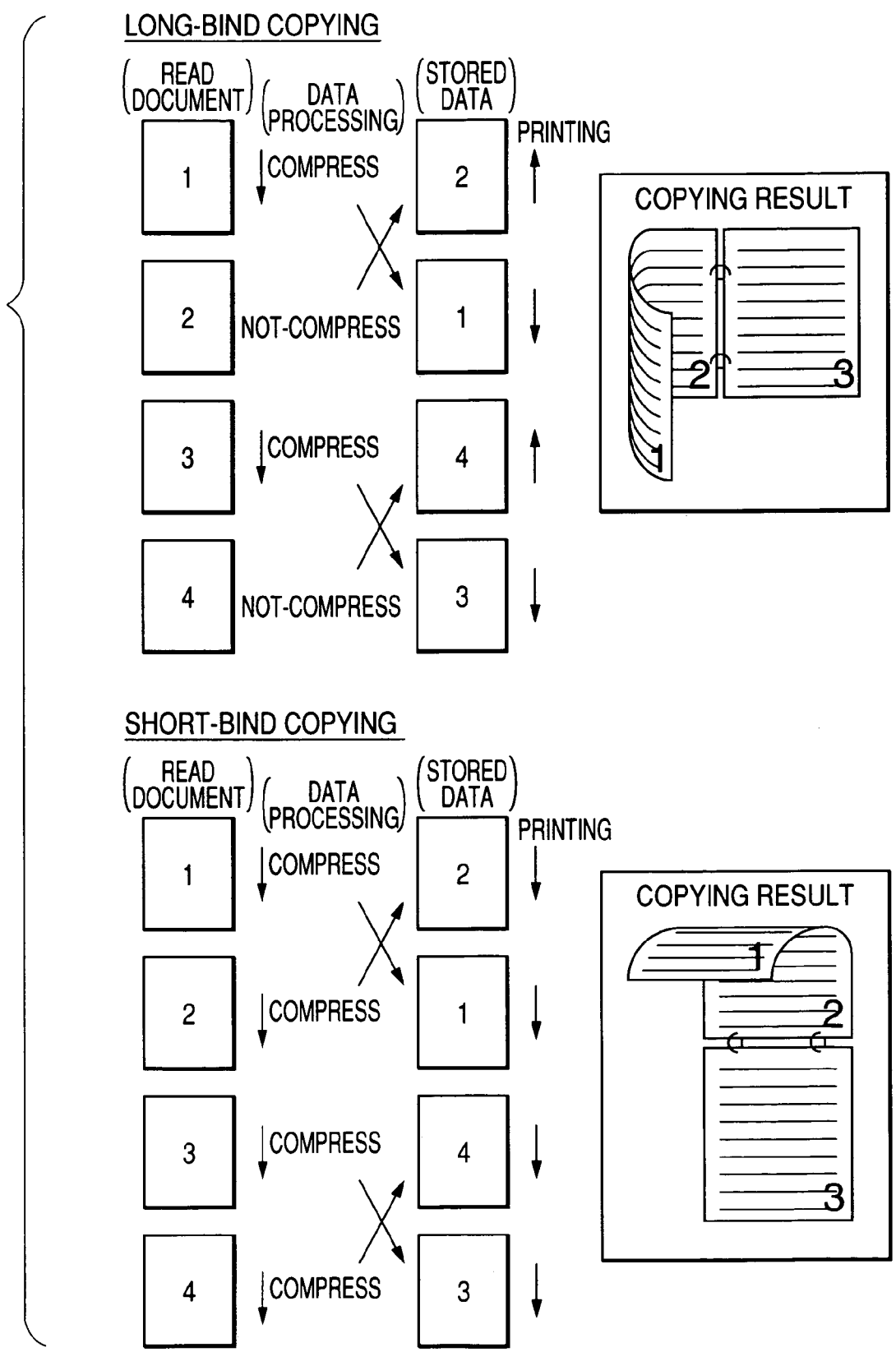
FIG. 7 is an explanatory view for explaining an operation at long-bind copying and an operation at short-bind copying as provided by the copy control process depicted in FIG. 6.

In the configuration of the printer section 2 according to this embodiment, in either case of the ordinary copy or the double-side record copy (DUPLEX), the sheet of recording paper 34 after an image has been formed thereon is discharged to the paper outlet tray 38 in the face down style. Therefore, when the double-side record copy is selected, first an image of an even page is formed on one surface of the sheet of recording paper 34 and then, an image of the odd page is formed on the other surface of the sheet of recording paper 34 in either the long binding or the short binding as shown in FIG. 7. Incidentally, the ADF mechanism 16 includes a sensor (e.g. mechanical or optical sensor) for detecting passage of both ends of a document. The CPU 72 can detect which of the even page and the odd page a document being read is on the basis of a detection result of the sensor of the ADF mechanism 16. In the configuration of this embodiment, in either of the long binding or the short binding, an image of the odd page is always formed on the sheet of recording paper 34 from top of image data in the data sequence. Incidentally, the head of the image data in the data sequence corresponds to a top of a document at a time of being read by the scanner section 3. In case of forming an image from the head of image data, the image data may be compressed data and the image may be formed while the compressed data is being expanded. Therefore, in this embodiment, image data of an odd page is always compressed in the double-side record copy. It should be noted that if the configuration of the printer section 2 is changed, an image of the even page may always be formed on the sheet of recording paper 34 from top of image data in the data sequence.

When a decision in S250 results in that the image read from the document at this time is of an odd page, the process proceeds to S260. In S260, the CPU 76 compresses image data (read data) read from the document in S210 and stores the compressed image data in another area than the print data storage area of the RAM 76. A known encode IC may perform S260 in place of the CPU 76. In this condition, the process proceeds to S320.

In this embodiment, image data obtained from the scanner section 3 are bitmapped data obtained successively for every scanning lines by the line CCD unit 24. Therefore, compression of image data in S260 and S230 is performed, for example, in such a manner that image data are compressed by run length coding for every each scanning line and further compressed on the basis of the correlation between the scanning line and a previous scanning line (that is, MH, MR, MMR, JBIG, etc).

On the other hand, when a decision in S250 results in that the image read from the document at this time is not of an odd page (i.e., of an even page), the process proceeds to S270. In S270, a judgment is made as to whether the flag "D_LONG" is set (ON) or not.

That is, in the double-side record copy mode, either long binding (LONG) or short binding (SHORT) is set as an operating mode for deciding the way of binding sheets of recording paper 34 after completion of double-side record copying. Either flag "D_LONG" or "D_SHORT" is set (ON) in accordance with the setting state of the operating mode. Accordingly, in S270, a judgment is made as to which of long binding (LONG) and short binding (SHORT) is set as the operating mode in the double-side record copy mode.

When a decision in S270 results in that the flag "D_LONG" indicating the long binding (LONG) is set (ON), the process proceeds to S280. In S280, image data (read data) read from the document in S210 is set as print data without being compressed. Then, the process proceeds to S300. This procedure is for the following reason. In the printer section 2 in this embodiment, a direction of recording of print data on each sheet of recording paper 34 in a case where an image is formed on a front surface of the sheet of recording paper 34 is opposite to that in a case where an image is formed on a rear surface of the sheet of recording paper 34. As shown in FIG. 7, recording of an even page such as the second page or the fourth page needs to start at the rear end of the page when the long binding is designated. If image data of an even page were compressed and thereafter an image of the even page were formed from the bottom thereof in the long binding, it would be necessary to expand the entire compressed data of the even page in order to form an image from the back of the image data. In other words, it would be impossible to form an image from the end of the image data while expanding the compressed data. This is because it is impossible to expand the compressed data from the end thereof reversely.

On the other hand, when a decision in S270 results in that the flag "D_LONG" is not set (ON), that is, the flag "D_SHORT" indicating the short binding (SHORT) is set (ON), the process proceeds to S290. In S290, image data (read data) read from the document in S210 are compressed in the same manner as in S260. Then, the process proceeds to S300. This procedure is for the following reason. When the short binding is designated, it is necessary to record image data so that the recording direction in the case where an image is formed on the front surface of the sheet of recording paper 34 is different from that in the case where an image is formed on the rear surface of the sheet of recording paper 34. In the printer section 2 in this embodiment, therefore, recording of all pages can start at the top of each page as shown in FIG. 7. At the point of time when processing in S280 or S290 is executed, compressed data of an odd page generated in S260 and not-compressed print data or compressed data of an even page set or generated in S280 or S290 are present as print data that have been not stored in the print data storage area of the RAM 76 yet. Accordingly, in S300, data of the even page are first stored in the print data storage area of the RAM 76. Then, in S310, compressed data generated in S260 and stored in the other storage area are stored in the print data storage area of the RAM 76. Then, the process proceeds to S320.

In this embodiment, processings in S300 and S310 are performed so that image data of an even page are stored in the RAM 76 (specifically, in the print data storage area) before compressed data of an odd page are stored in the RAM 76. This is for the purpose of forming an image of an odd page on the rear surface of each sheet of recording paper 34 after forming an image of an even page on the single surface (front surface) of each sheet of recording paper 34 when the printer section 2 is operated to form images on both surfaces of each sheet of recording paper 34.

That is, in the printer section 2 in this embodiment, sheets of recording paper 34 after formation of images are stacked on the paper outlet tray 38 in a so-called face down style in which the image-forming surfaces of the sheets of recording paper 34 facedown. Therefore, when images are formed in the double-side record copy mode so that an image of an odd page is formed after an image of an even page is formed, an image of the first page can appear in the forefront of the sheets of recording paper 34 stacked on the paper outlet tray 38. Accordingly, the sheets of recording paper 34 stacked on the paper outlet tray 38 can be bound as they are when either long binding or short binding is selected.

Then, in S320, a judgment is made as to whether a document of the next page to be read is present or not. That is, a judgment is made as to whether or not the document from which an image is read in S210 at this time corresponds to one of a plurality of documents placed on the document supply tray 18 of the scanner section 3 and any document from which an image has been not read yet is placed on the document supply tray 18. Incidentally, this judgment may be made on the basis of information acquired from the scanner section 3 through the scanner control section 80 or may be made on the basis of detection due to a document sensor (not shown) provided in the ADF mechanism 16.

When a decision in S320 results in that a document of the next page to be read is present, the process proceeds to S210 so that the aforementioned series of processing is executed. On the other hand, when a decision in S320 results in that there is no document of the next page to be read, the process proceeds to S330. In S330, a judgment is made as to whether data not-stored in the print data storage area of the RAM 76 (specifically, compressed data of odd pages generated in S260) are present in data read from documents by the series of processing or not.

When a decision in S330 results in that there is some not-stored data, S340 is carried out so that not-stored data are stored as data of an odd page in the print data storage area of the RAM 76 after blank data are stored as data of the last even page. Then, the process proceeds to S350. On the other hand, when a decision in S330 results in that there is not not-stored data, the process skips to S350.

In S350, the print data stored in the print data storage area of the RAM 76 by the aforementioned processing are page by page read in data storing order. When the read print data are compressed data, the print data are expanded and sent to the printer control section 82 successively. When the read print data are not-compressed data, the print data are inverted in terms of data sequence and sent to the printer control section 82. In this manner, the printer control section 82 is made to control the printer section 2 in the current operating mode.

As described above, in the multi function device 1 according to this embodiment, when images of documents are to be copied on both surfaces of sheets of recording paper 34, the user can select either the short binding (SHORT) or long the binding (LONG) as the way of binding the sheets of recording paper 34 after double-side record copying.

As shown in FIG. 7, when the long binding is designated in the double-side record copy mode (long bind copy shown in FIG. 7), image data read from documents through the scanner section 3 are stored in the print data storage area of the RAM 76 in such a manner that image data of odd pages are stored as compressed data whereas image data of even pages are stored as not-compressed data. Incidentally, these data are stored in the print data storage area of the RAM 76 while changing the order of compressed data of each odd page and not-compressed data of a corresponding even page paired with the odd page. Further, at the time of formation of images (at the time of printing), the print data are read from the RAM 76 page by page. As represented by the arrow in FIG. 7, whenever a page of not-compressed data is read, the not-compressed data are inverted in terms of data sequence and sent to the printer section 2 so that formation of an image on a sheet of recording paper 34 by the printer section 2 can start at the bottom of the page. Whenever a page of compressed data is read, the compressed data are sent to the printer section 2 in order of reading data from the RAM 76 so that formation of an image on a sheet of recording paper 34 by the printer section 2 can start at the top of the page.

Accordingly, after long-bind copying, the plurality of recording papers 34 stacked on the paper outlet tray 38 can be bound in the long binding style as they are. As represented by the copying result shown in FIG. 7, inverted images can be avoided when pages are turned one by one. Accordingly, the aforementioned inversion phenomenon can be prevented.

On the other hand, as shown in FIG. 7, when the short binding is designated in the double-side record copy mode (short-bind copying shown in FIG. 7), all image data read from documents through the scanner section 3 are stored as compressed data in the print data storage area of the RAM 76. Incidentally, these data are stored in the print data storage area of the RAM 76 while changing the order of compressed data of each odd page and compressed data of a corresponding even page paired with the odd page. At the time of formation of images (at the time of printing), compressed data of all pages stored in the RAM 76 are expanded page by page and sent to the printer section 2 in order of reading data from the RAM 76 so that formation of an image on a sheet of recording paper 34 by the printer section 2 can start at the top of each page as represented by the arrow in FIG. 7.

Accordingly, after the short-bind copying, the plurality of recording papers 34 stacked on the paper outlet tray 38 can be bound in the short binding style as they are. As represented by the copying result shown in FIG. 7, inverted images can be avoided when pages are turned one by one. Accordingly, the aforementioned inversion phenomenon can be prevented, like the long-bind copying.

In the short-bind copying, it is unnecessary to invert and restore the compressed data in terms of data sequence when images are formed on the recording media. Therefore, extra time required for restoring the inverted compressed data is not required, so that the capacity of the storage unit (memory) for storing image data of documents can be saved more greatly.

In the multi function device 1 according to this embodiment, image data read through the scanner section 3 at the time of copying are stored in the print data storage area of the RAM 76 in such a manner that image data having a data sequence opposite to the direction of formation of an image on a sheet of recording paper 34 (i.e., the transporting direction of the sheet of recording paper 34) are stored as not-compressed data but all the other image data are stored as compressed data in the print data storage area of the RAM 76.

Accordingly, in the multi function device 1 according to this embodiment, it is possible not only to prevent the inversion phenomenon occurring when sheets of recording paper 34 subjected to double-side record copying are bound but also to prevent the problem occurring when image data having data sequence opposite to the transporting direction of a sheet of recording paper 34 are compressed, while the print data storage area of the RAM 76 can be saved by compression of image data. That is, if image data having data sequence opposite to the transporting direction of sheets of recording paper 34 are compressed as described above, it is necessary to expand and invert the compressed data in terms of data sequence when images are formed on the sheets of recording paper 34. In this embodiment, however, the time required for forming images can be shortened because such image data are stored as not-compressed data in the RAM 76.

(Embodiment 2)

Figure 9:
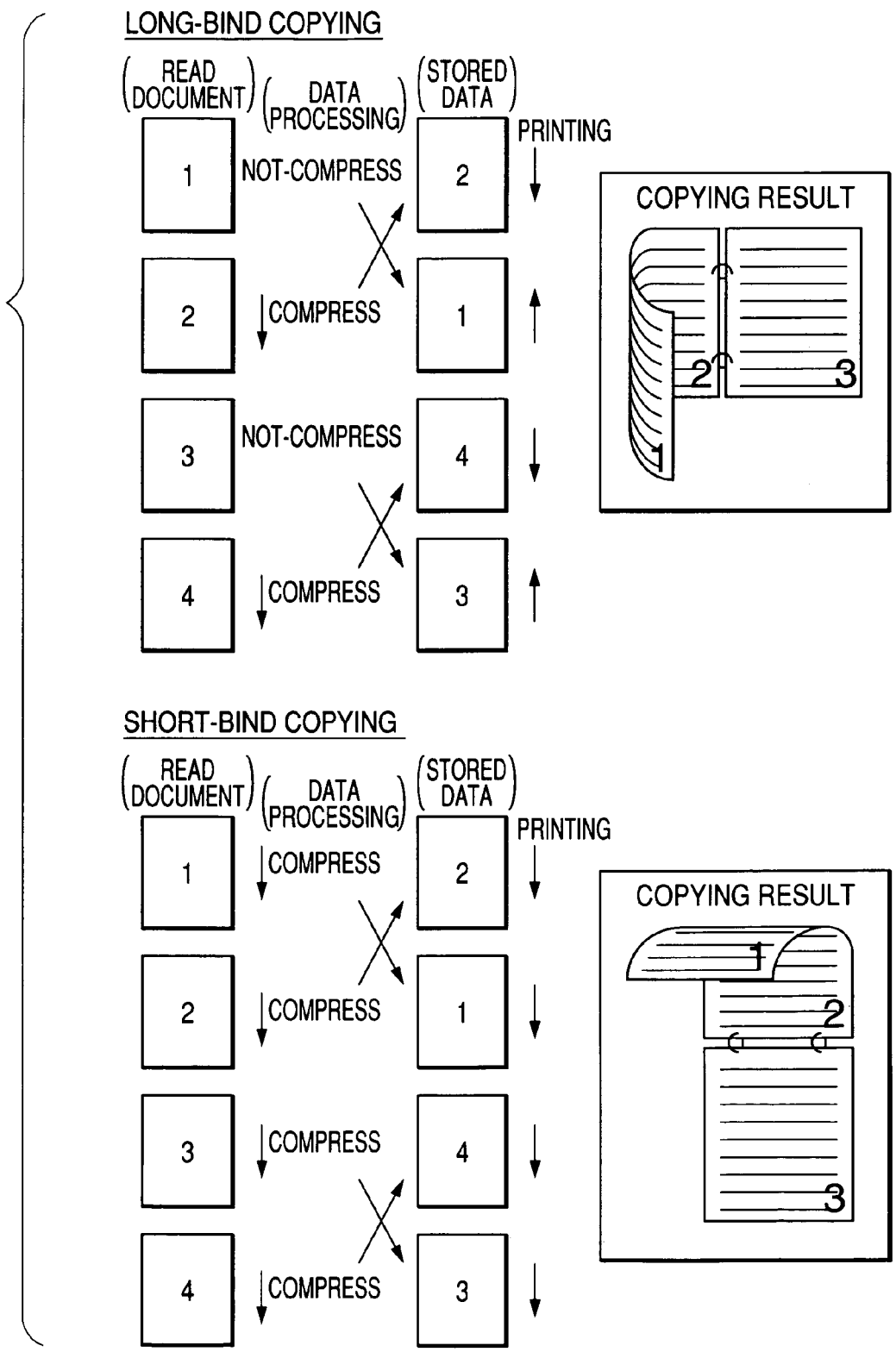
FIG. 9 is an explanatory view for explaining an operation at long-bind copying and an operation at short-bind copying as provided by the copy control process depicted in FIG. 8.

A multi function device 1 according to an embodiment 2 is similar to that according to the embodiment 1. The embodiment 2 is different from the embodiment 1 in an image formation process in the long bind copy, as shown in FIG. 9.

Figure 8:
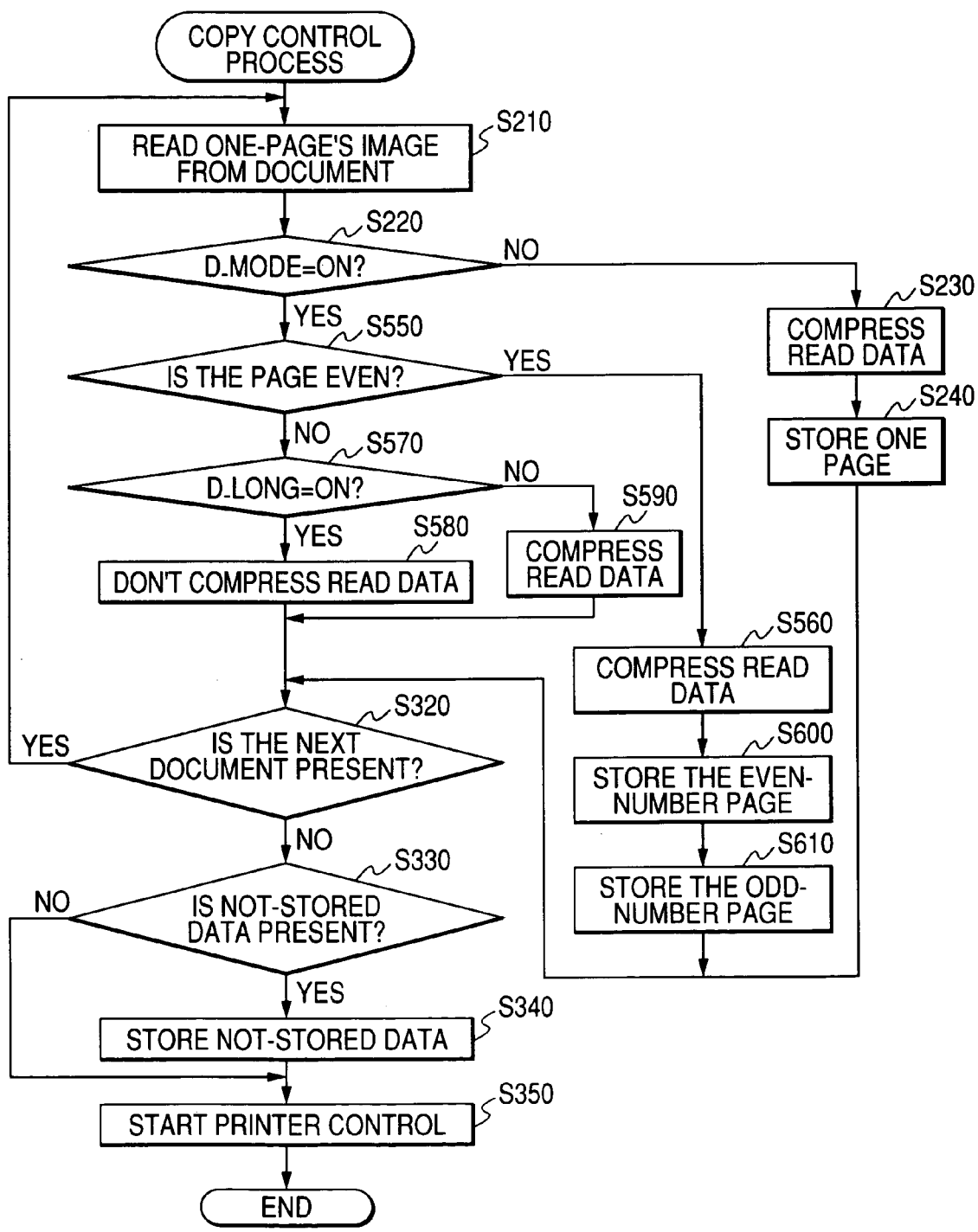
FIG. 8 is a flow chart showing a copy control process executed in an embodiment 2.

FIG. 8 is a flow chart showing a copy control process of the embodiment 2. In S220, a judgment is made as to whether the flag "D_MODE" is set (ON) or not. When the decision in S220 results in that the flag "D_MODE" is not set, the process proceeds to S230 and S240 as with the embodiment 1. On the other hand, when the judgment in S220 results in that the flag "D_MODE" is set (ON), the process proceeds to S550.

In S550, a judgment is made as to whether the image read at this time from the document in S210 is of an even page in the plurality of documents placed on the document supply tray 18 or not.

When a decision in S550 results in that the image read from the document at this time is not of an even page (i.e., of an odd page), the process proceeds to S570. In S570, a judgment is made as to whether the flag "D_LONG" is set (ON) or not.

When a decision in S570 results in that the flag "D_LONG" indicating the long binding (LONG) is set (ON), the process proceeds to S580. In S580, image data (read data) read from the document in S210 is set as print data without being compressed. Then, the process proceeds to S320.

On the other hand, when a decision in S570 results in that the flag "D_LONG" is not set, the process proceeds to S590. In S590, image data (read data) read from the document in S210 are compressed and the compressed data are stored in another area than the print data storage area of the RAM 76. That is, image data of an odd page is compressed and stored. Then, the process proceeds to S320.

On the other hand, when a decision in S550 results in that the image read from the document at this time is of an even page, the process proceeds to S560. In S560, the CPU 76 compresses image data (read data) read from the document in S210 and stores the compressed data in another area than the print data storage area of the RAM 76. Then, the process proceeds to S600. In S600, compressed data of the even page, which have been generated in S560 and stored in the other storage area, are first stored in the print data storage area of the RAM 76. Then, in S610, non-compressed data of an odd page or compressed data of an odd page are stored in the print data storage area of the RAM 76. Then, the process proceeds to S320.

The processings in S320 and subsequent steps are the same as those of the embodiment 1. Therefore, description thereon is omitted.

As shown in FIG. 9 when the long binding is designated in the double-side record copy mode (long bind copy shown in FIG. 9), image data read from documents through the scanner section 3 are stored in the print data storage area of the RAM 76 in such a manner that image data of even pages are stored as compressed data whereas image data of odd pages are stored as not-compressed data. Incidentally, these data are stored in the print data storage area of the RAM 76 while changing the order of compressed data of each even page and not-compressed data of a corresponding odd page paired with the even page. Further, at the time of formation of images (at the time of printing), the print data are read from the RAM 76 page by page. As represented by the arrow in FIG. 9, whenever a page of not-compressed data is read, the not-compressed data are inverted in terms of data sequence and sent to the printer section 2 so that formation of an image on a sheet of recording paper 34 by the printer section 2 can start at the bottom of the page. Whenever a page of compressed data is read, the compressed data are sent to the printer section 2 in order of reading data from the RAM 76 so that formation of an image on a sheet of recording paper 34 by the printer section 2 can start at the top of the page.

Accordingly, after long-bind copying, the plurality of recording papers 34 stacked on the paper outlet tray 38 can be bound in the long binding style as they are. As represented by the copying result shown in FIG. 9, inverted images can be avoided when pages are turned one by one. Accordingly, the aforementioned inversion phenomenon can be prevented.

(Embodiment 3)

Figure 10:
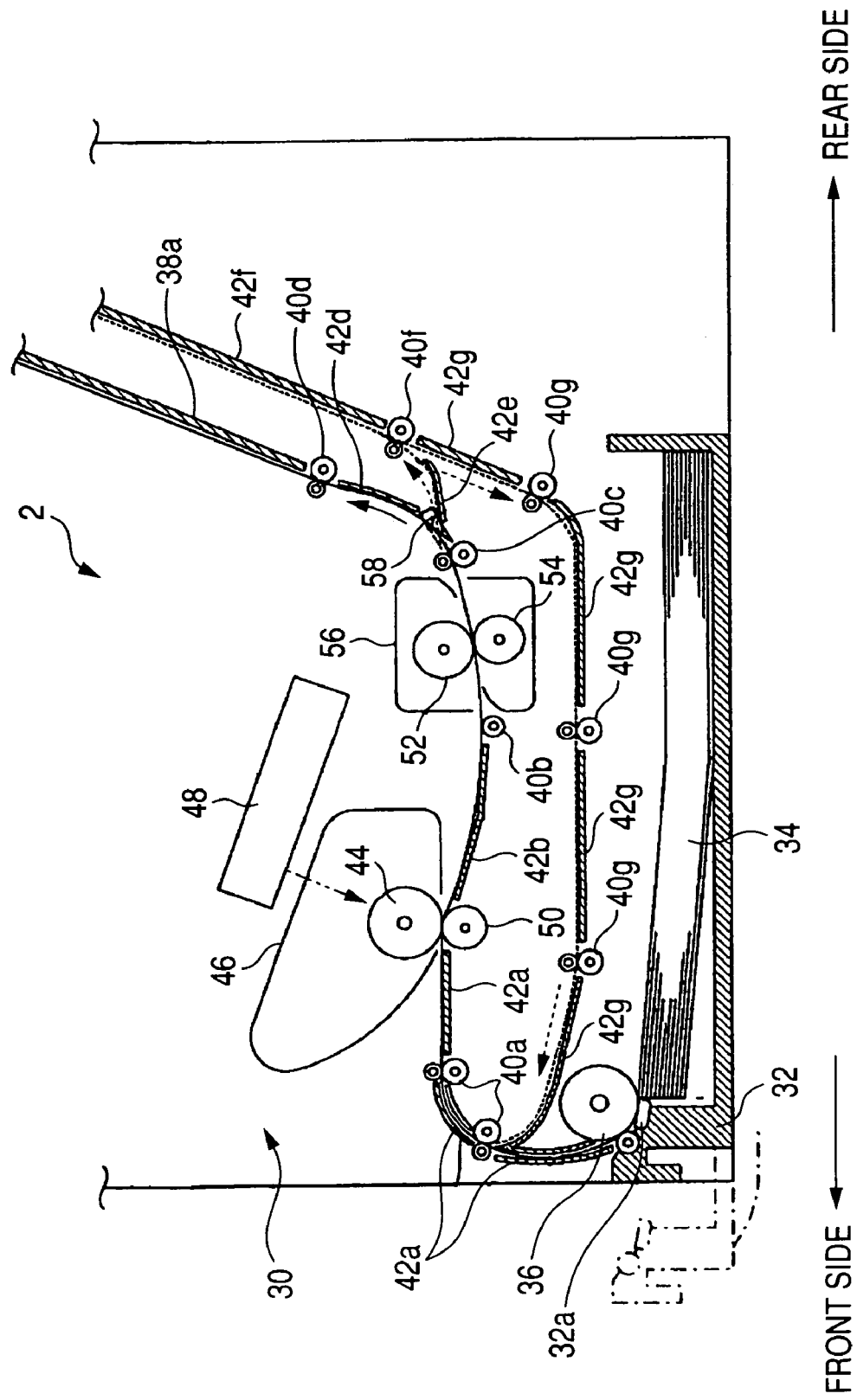
FIG. 10 is a sectional view showing a configuration of a printer section according to an embodiment 3.

A multi function device 1 according to an embodiment 3 is similar to that according to the embodiment 1. The embodiment 3 is different from the embodiment 1 in a position of a paper outlet tray. In the embodiment 3, instead of the paper outlet tray 38, the printer section 2 includes a paper outlet tray 38a on a rear side as shown in FIG. 10. A user takes a recording paper 34 on which an image has been formed from the rear side of the multi function device 1.

Figure 11:
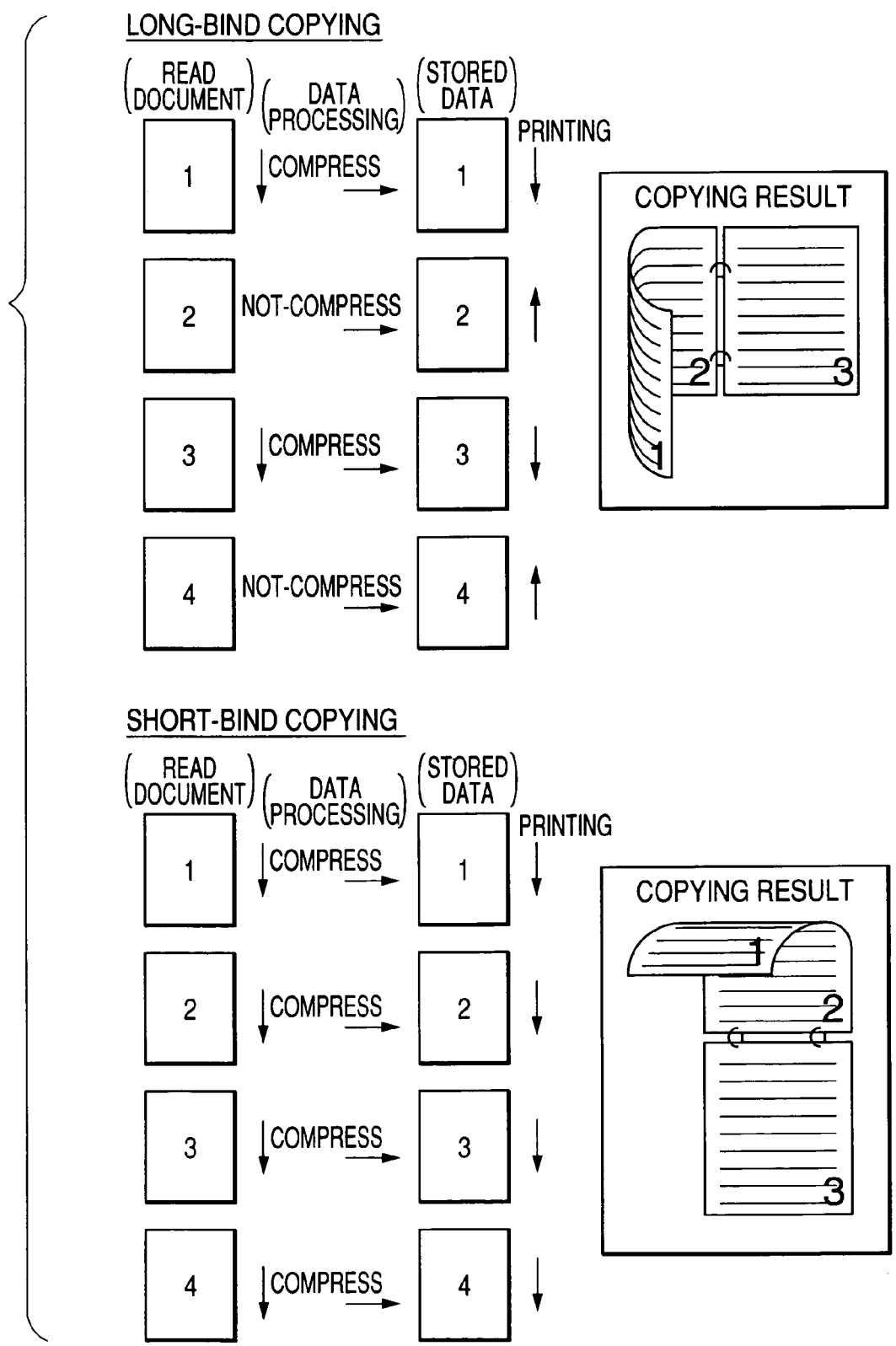
FIG. 11 is an explanatory view for explaining an operation at long-bind copying and an operation at short-bind copying as provided by a copy control process of the embodiment 3.

In this configuration, when the double-side record copy is designated, images are formed on both sides of the recording papers 34 in order of the page number as shown in FIG. 11 in order to obtain the recording papers 34 bound in the so-called face up style.

Figure 12:
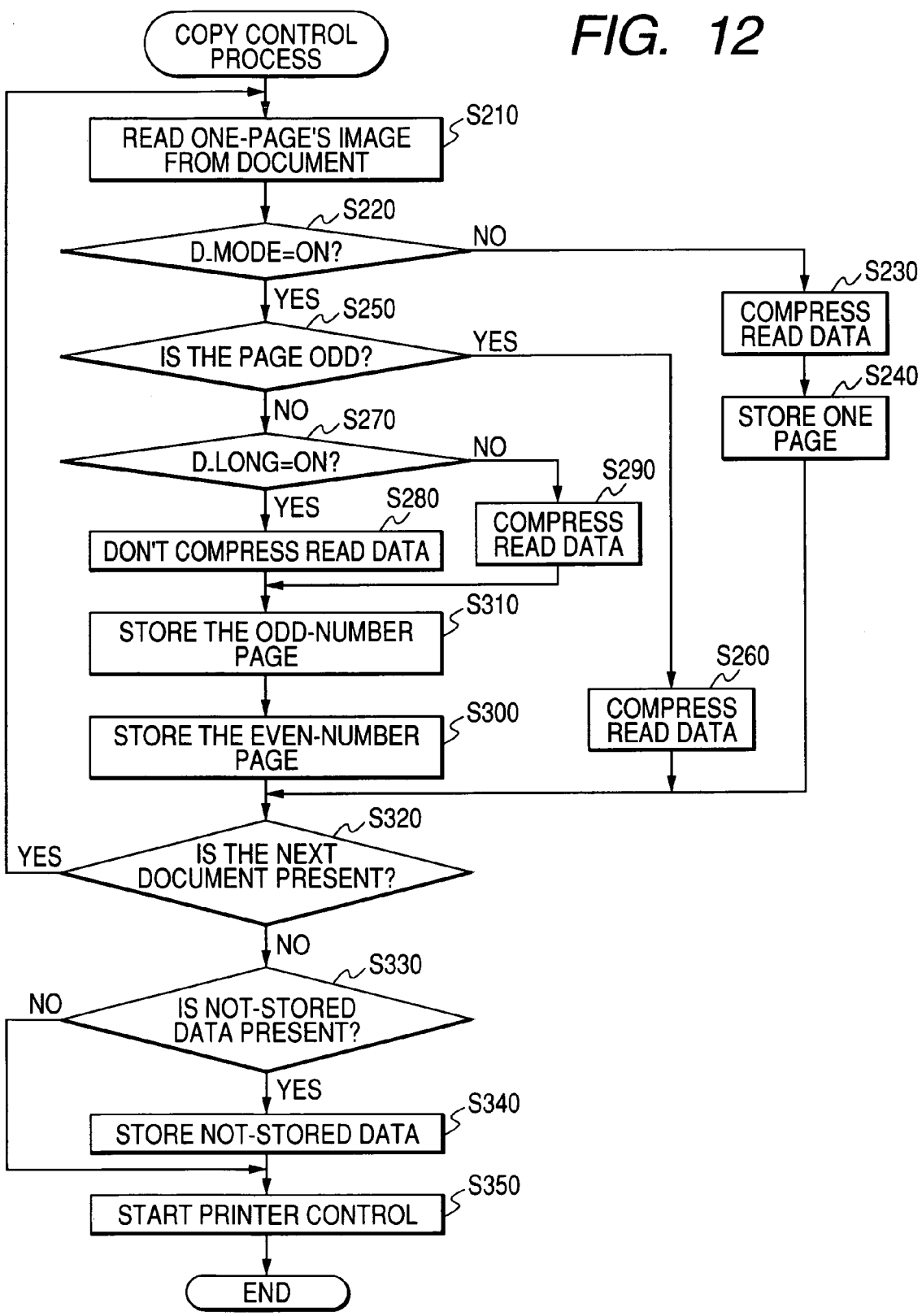
FIG. 12 is a flow chart showing the copy control process executed in the embodiment 2

The copy control process of the embodiment 3 a flow chart of which is shown in FIG. 12 is also similar to that of the embodiment 1. As shown in FIG. 12, an order of S300 and S310 is inverted in the embodiment 3. This is because the images are formed in order of the page number as described above. That is, there is no need to change a storage order of an odd page and a corresponding even page.

In another embodiment, S310 may not be performed before S300, but may be performed after S260.

Although an embodiment of the invention has been described above, the invention is not limited to the embodiment and may be modified variously.

For example, the embodiment has been described on the case where the invention is applied to image data processing for double-side record coping in the multi function device 1 having a copying function. For example, also in the case where images are formed on both surfaces of sheets of recording paper 34 in accordance with print data received from the external PC 90 (or another information appliance), the same effect as in the embodiment can be obtained if the print data are stored in the print data storage area of the RAM 76 in the same procedure as used in the copy control process shown in FIG. 6.

The embodiment has been described on the case where a plurality of documents placed on the document supply tray 18 are copied in such a manner that formation of images by the printer section 2 starts after images are read from all documents. However, when, for example, the double-side record copy mode is selected, the invention may be modified so that formation of images starts whenever images are read from documents corresponding to two pages.

Although the embodiment has been described on the case where a printer engine for laser printer use is used as the printer engine 30 included in the multi function device 1, it is a matter of course that the same effect as in the embodiment can be obtained in the case where the invention is applied to a multi function device including a printer engine for ink jet color printer use or color laser printer use.

Although the embodiment has been described on the case where the invention is applied to the multi function device 1, the same effect as in the embodiment can be obtained in the case where the invention is applied to a printer including a double-side printing function.

Although the embodiment has been described on the case where both compressed data and not-compressed data as image data are stored in the print data storage area of the RAM 76, the invention may be applied to the case where compressed data and not-compressed data are stored in different memories respectively.

Hardware capable of expanding compressed data may be provided in the printer control section 82 in order to improve processing speed. In this case, it is possible not only to shorten the data processing time but also to lighten the load on the CPU because the printer control section 82 can be operated to perform printing when compressed data are input to the hardware as they are at the time of recording.

What is claimed is:

1. A double-side image forming apparatus comprising:
a storage unit which stores data, the data including image data;
an image forming unit which forms an image on a recording medium on the basis of the data stored in the storage unit;
a transporting unit which transports the recording medium and turns upside down the recording medium, a first side of which the image has been formed;
an image data compression unit which compresses at least a portion of the image data stored in the storage unit;
a determining unit which determines whether the image data will undergo a storage process after a compression process or the image data will undergo the storage process without the compression process; and
an image data storage unit which:
controls the compression process of the image data compression unit based on a result of the determination of the determining unit,
makes the image data compression unit compress image data to be formed on the first side of the recording medium, the image of the first side formed in a forward direction by the image forming unit, the image data compression unit compressing the image data of the first side based on the forward direction of image forming to be performed by the image forming unit, the image data storage unit making the storage unit store the compressed image data; and
makes the storage unit store uncompressed image data to be formed on a second side of the recording medium, the image of the second side formed in a reverse direction by the image forming unit, the image data compression unit determining not to compress image data of the second side based on the reverse direction of image forming to be performed by the image forming unit,
wherein:
when the uncompressed image data is read from the storage unit for forming an image on a recording medium, the uncompressed image data is inverted and the image forming unit forms an image on a recording medium based on the inverted image data;
when the compressed image data is read from the storage unit for forming an image on a recording medium, the compressed image data is expanded and the image forming unit forms an image on a recording medium based on the expanded image data.

2. The double-side image forming apparatus according to claim 1, wherein:
the transporting unit transports the recording medium in at least one of the reverse direction and the forward direction when the image forming unit forms the image on the recording medium;
the transporting unit turns upside down the recording medium one surface of which the image has been formed so that one end of the recording medium, which has faced downstream when the image forming unit has formed the image on the one surface of the recording medium, faces upstream; and
the transporting unit transports the recording medium, the one surface of which the image has been formed in the at least one of the forward direction and the reverse direction when the image forming unit forms another image on the other surface thereof.

3. The double-side image forming apparatus according to claim 1, further comprising:
a mode selecting unit which selects one of a first mode and a second mode, wherein:
in a first mode, the image is formed on the recording medium so that a first edge, extending along the forward direction or the reverse direction, of the recording medium is bound;
in a second mode, the image is formed on the recording medium so that a second edge, extending along a direction perpendicular to the forward or reverse direction, of the recording medium is bound;
when the mode selecting unit selects the first mode, the image data storage unit:
makes the image data compression unit compresses the image data including the data sequence of the forward direction with respect to the predetermined direction and makes the storage unit store the compressed image data; and
makes the image data storage unit stores the image data including the data sequence of the reverse direction.

4. The double-side image forming apparatus according to claim 3, wherein when the mode selecting unit selects the second mode, the image data storage unit makes the image data compression unit compress all the image data to be formed on both sides of the recording medium and makes the storage unit store the compressed image data.

5. The double-side image forming apparatus according to claim 1, further comprising:
a document reading unit which reads an image from a document to output image data of the read image.

6. The double-side image forming apparatus according to claim 1, wherein:
the image data is transmitted from an external information appliance.

7. The double-side image forming apparatus according to claim 3, wherein:
one of the image data to be formed on the first side of the recording medium in the forward direction and the image data to be formed on the second side of the recording medium in the reverse direction is image data of an even page; and
the other of the image data to be formed on the first side of the recording medium in the forward direction and the image data to be formed on the second side of the recording medium in the reverse direction is image data of an odd page.

8. The double-side image forming apparatus according to claim 7, wherein:
the storage unit stores the image data to be formed on the second side of the recording medium in the reverse direction and then stores the counterpart compressed image data to be formed on the first side of the recording medium in the forward direction.

9. The double-side image forming apparatus according to claim 1, wherein:
when the image forming unit forms the image on the recording medium on the first side in the forward direction on the basis of the compressed image data, the image forming unit forms the image while the compressed image data is being expanded.

10. A double-side image forming apparatus comprising:
a storage unit which stores data, the data including image data;
an image forming unit which forms an image on a recording medium on the basis of the data stored in the storage unit;
a transporting unit which transports the recording medium and turns upside down the recording medium, after first image data has been formed on the recording medium;
an image data compression unit which compresses at least a portion of the image data stored in the storage unit;
a determining unit which determines whether the image data will undergo a storage process after a compression process or the image data will undergo the storage process without the compression process; and
a control unit which:
controls the compression process of the image data compression unit based on a result of the determination of the determining unit,
makes the image data compression unit compress the first image data, an image of which is to be formed from a top of the recording medium, and makes the storage unit store the compressed first image data,
makes the storage unit store uncompressed second image data, an image of which is to be formed from a bottom of the recording medium, and
determines whether to compress the first image data based on the direction of image forming being from a top of the recording medium, the control unit further determining not to compress the second image data based on the direction of image forming being from a bottom of the recording medium,
wherein:
when the uncompressed image data is read from the storage unit for forming an image on a recording medium, the uncompressed image data is inverted and the image forming unit forms an image on a recording medium based on the inverted image data;
when the compressed image data is read from the storage unit for forming an image on a recording medium, the compressed image data is expanded and the image forming unit forms an image on a recording medium based on the expanded image data.

11. The double-side image forming apparatus according to claim 10, wherein:
the transporting unit transports the recording medium at least one of the reverse direction and the forward direction when the image forming unit forms the image on the recording medium;
the transporting unit turns upside down the recording medium one surface of which the image has been formed so that one end of the recording medium, which has faced downstream when the image forming unit has formed the image on the one surface of the recording medium, faces upstream; and
the transporting unit transport the recording medium the one surface of which the image has been formed in the at least one of the reverse direction and the forward direction when the image forming unit forms another image on the other surface thereof.

12. The double-side image forming apparatus according to claim 10, further comprising:
a mode selecting unit which selects one of a first mode and a second mode, wherein:
in the first mode, the recording medium on which the image has been formed is bound along the forward direction or the reverse direction;

in the second mode, the recording medium on which the image has been formed is bound along a direction perpendicular to the forward direction or the reverse direction; and when the mode selecting unit selects the first mode, the control unit:

makes the image data compression unit compress the first image data and makes the storage unit store the compressed first image data; and makes the storage unit store the second image data.

13. The double-side image forming apparatus according to claim 12, wherein when the mode selecting unit selects the second mode, the control unit makes the image data compression unit compress the first image data and the second image data and makes the storage unit store the compressed first image data and the compressed second image data.

14. The double-side image forming apparatus according to claim 10, further comprising:

a reading unit which reads an image of a document to output image data of the read image.

15. The double-side image forming apparatus according to claim 10, wherein:

the image data is transmitted from an external information appliance.

16. The double-side image forming apparatus according to claim 12, wherein:

one of the first image data and the second image data is image data of an odd page; and the other of the first image data and the second image data is image data of an even page.

17. The double-side image forming apparatus according to claim 16, wherein:

the storage unit stores the second image data and then stores the counterpart first image data compressed.

18. The double-side image forming apparatus according to claim 10, wherein:

when the image forming unit forms the image on the recording medium on the basis of the compressed first image data, the image forming unit forms the image while the control unit is expanding the compressed first image data.

19. A double-side image forming method comprising:

determining whether image data will undergo a storage process after a compression process or the image data will undergo the storage process without the compression process;

controlling the compression process based on a result of the determining;

compressing first image data of a first side of a recording medium based on a first direction the first image data is to be formed on a recording medium, and storing the compressed image data;

storing uncompressed second image data of a second side of the recording medium based on a second direction the second image data is to be formed on the recording medium;

forming images on the first side of the recording medium while transporting the recording medium in the first direction;

turning upside down the recording medium one surface of which the image has been formed; and forming images on the second side of the recording medium while transporting the recording medium in the second direction, wherein:

when the uncompressed image data is read from the storage unit for forming an image on a recording medium, the uncompressed image data is inverted and the image forming unit forms an image on a recording medium based on the inverted image data;

when the compressed image data is read from the storage unit for forming an image on a recording medium, the compressed image data is expanded and the image forming unit forms an image on a recording medium based on the expanded image data.

20. The double-side image forming method according to claim 19, wherein:

the recording medium is turned upside down so that one end of the recording medium, which faced downstream when the image forming unit has formed the image on the one surface of the recording medium, faces upstream.

21. The double-side image forming method according to claim 19, wherein:

selecting one of a first mode and a second mode, wherein:

in the first mode, the images are formed on the recording medium so that a first edge, extending along the first direction or the second direction, of the recording medium is bound;

in the second mode, the images are formed on the recording medium so that a second edge, extending along a direction perpendicular to the first direction or the second direction, of the recording medium is bound;

when the first mode is selected, the image data to be formed on the first side of the recording medium in the first direction is compressed; the compressed image data is stored; and the image data to be formed on the second side of the recording medium in the second direction is stored.

22. The double-side image forming method according to claim 21, wherein:

when the second mode is selected, all the image data is compressed and the compressed image data is stored.

23. The double-side image forming method according to claim 19, further comprising:

reading an image from a document to output image data of the read image.

24. The double-side image forming method according to claim 19, further comprising:

transmitting the image data from an external information appliance.

25. The double-side image forming method according to claim 21, wherein:

one of the image data to be formed on the first side of the recording medium in the first direction and the image data to be formed on the second side of the recording medium in the second direction is image data of an odd page; and the other of the image data to be formed on the first side of the recording medium in the first direction and the image data to be formed on the second side of the recording medium in the second direction is image data of an even page.

26. The double-side image forming method according to claim 21, wherein:

the storing of the compressed image data to be formed on the first side of the recording medium in the first direction is performed before the storing of the counterpart image data to be formed on the second side of the recording medium in the second direction.

27. The double-side image forming apparatus according to claim 19, wherein:

when the image is formed on the recording medium on the basis of the image data to be formed on the first side of the recording medium in the first direction, the forming of the image is performed while the compressed image data to be formed on the second side of the recording medium in the second direction is being expanded.

28. The double-side image forming apparatus according to claim 1, wherein:

after the image data compression unit receives the entire image data to be formed on the first side of the recording medium in the forward direction, the image data compression unit compresses the image data to be formed on the second side of the recording medium in the reverse direction.

29. The double-side image forming apparatus according to claim 1, wherein:

when the print setting information is information relating to long-binding or short-binding.

* * * * *